United States Patent
Meyer

[11] Patent Number: 5,812,247
[45] Date of Patent: Sep. 22, 1998

[54] ARRANGEMENT FOR OPTICALLY TRACKING MOVING OBJECTS AND FOR MEASURING THEIR TRAJECTORIES

[75] Inventor: Friedrich-Wilhelm Meyer, Harpstedt, Germany

[73] Assignee: STN ATLAS Electronik GmbH, Bremen, Germany

[21] Appl. No.: 772,717

[22] Filed: Dec. 23, 1996

[30] Foreign Application Priority Data

Dec. 23, 1995 [DE] Germany ......................... 195 48 752.4

[51] Int. Cl.$^6$ ....................................................... G01C 3/00
[52] U.S. Cl. ....................... 356/3.16; 342/451; 250/203.1
[58] Field of Search ................................. 356/3.14, 3.16, 356/140, 147, 152.1; 342/451; 250/203.1

[56] References Cited

U.S. PATENT DOCUMENTS

| | | |
|---|---|---|
| 2,990,618 | 7/1961 | Petree et al. . |
| 4,449,817 | 5/1984 | Abler . |
| 4,622,458 | 11/1986 | Boeck et al. ......................... 250/203 R |
| 5,008,543 | 4/1991 | Bertrand et al. ......................... 250/342 |

FOREIGN PATENT DOCUMENTS 3244255  6/1984  Germany .

*Primary Examiner*—Mark Hellner
*Attorney, Agent, or Firm*—Spencer & Frank

[57] ABSTRACT

An arrangement for optically tracking moving objects and for measuring trajectories of the moving objects using triangulation. The arrangement includes a pair of measuring locations including a first measuring location and a second measuring location disposed at a distance with respect to the first measuring location. The arrangement further includes a plurality of pairs of theodolites for simultaneously tracking and measuring the trajectories of the moving objects, each pair of theodolites being effective for tracking and measuring a trajectory of a corresponding moving object and further having a first theodolite and a second theodolite. First theodolites of each pair of theodolites together form a first set of theodolites disposed on a common azimuthal axis at the first measuring location; and second theodolites of each pair of theodolites together form a second set of theodolites disposed on a common azimuthal axis at the second measuring location.

8 Claims, 2 Drawing Sheets

ARRANGEMENT FOR OPTICALLY TRACKING MOVING OBJECTS AND FOR MEASURING THEIR TRAJECTORIES

CROSS REFERENCE TO RELATED APPLICATION

This application claims the priority of application Ser. No. 195 48 752.4 filed in Germany on Dec. 23, 1995, the subject matter of which is incorporated herein by reference.

STATEMENT REGARDING FEDERALLY SPONSORED RESEARCH OR DEVELOPMENT

Not applicable.

FIELD OF THE INVENTION

The invention relates to an arrangement for optically tracking moving objects and for measuring their trajectories according to known methods, such as the triangulation method. The invention relates in particular to the tracking and trajectory measurement of flying objects.

BACKGROUND OF THE INVENTION

It is known in the prior art to use theodolites, measuring instruments having optical or optoelectronic sensors for continuously tracking the movement of objects by keeping a line of sight of the sensors aimed at the object. Theodolites are capable of continuously evaluating both an azimuthal angle and an elevational angle corresponding to the line of sight toward the object in a predetermined coordinate system having rectangular coordinates disposed one on top of the other.

A tracking and measuring arrangement of the above kind is disclosed in German published application DE 32 44 255 A1. Such an arrangement includes several path control stations positioned at a distance with respect to one another. Each path control station comprises a theodolite and a path control center. The path control center is configured to communicate with path control centers of other path control stations and further to evaluate the data supplied by the theodolites. In order to obtain an extremely exact measurement for the trajectory of an object according to a method known as the triangulation method, the data from a pair of linked theodolites are used in making the measurement. Any additional pairs of theodolites aimed at the same object would then supply redundant information, which information is nevertheless useful in improving upon the exactness of the trajectory measurement effected using the first pair of theodolites. According to the above tracking and measurement process, for each object to be tracked and to be subjected to a trajectory measurement, at least one pair of theodolites is necessary. The theodolites of each pair must be erected at distinct path control stations and must operate, i.e. supply tracking data relating to the object, independently of one another. Thus, for a simultaneous tracking and trajectory measurement of two objects, at least two pairs of theodolites comprising four independently operating theodolites must be provided. Similarly, for a simultaneous tracking and trajectory measurement of three objects, at least three pairs of theodolites comprising six independently operation theodolites must be provided.

The above arrangement has the disadvantage that it leads to a trajectory measurement which contains measurement errors introduced by each individual theodolite. These errors are correspondingly multiplied into the measurement results as a function of the number of theodolites being used, and reflect, among others, the location error of each measuring station, the instrument error and calibration error of each theodolite, the linear path error between the theodolite and the object, and the measuring data clock pulse error.

SUMMARY OF THE INVENTION

It is an object of the present invention to improve the tracking and measuring arrangement described above such that errors entered into the measurement results are reduced.

The above object, together with other objects to become apparent as the description progresses, are accomplished according to the invention by the provision of an arrangement for optically tracking moving objects and for measuring trajectories of the moving objects using triangulation, where the arrangement comprises a pair of measuring locations including a first measuring location and a second measuring location disposed at a distance with respect to the first measuring location. The arrangement further includes a plurality of pairs of theodolites for simultaneously tracking and measuring the trajectories of the moving objects, each pair of theodolites being effective for tracking and measuring a trajectory of a corresponding moving object and further having a first theodolite and a second theodolite. First theodolites of each pair of theodolites together form a first set of theodolites disposed on a common azimuthal axis at the first measuring location; and second theodolites of each pair of theodolites together form a second set of theodolites disposed on a common azimuthal axis at the second measuring location.

The tracking and measuring arrangement according to the invention allows a number of the measurement errors previously mentioned to be reduced to only two measurement errors that cannot be compensated for. Thus, only the above two errors must be taken into account in the arrangement according to the invention in considering the measurement results. The above is achieved according to the invention by the provision of a tracking and measuring arrangement where a set of theodolites, each theodolite of the set corresponding to a different theodolite pair for simultaneously tracking several objects, are disposed along a common, vertically oriented, that is, azimuthal axis.

According to the above, the location error for the respective measuring locations, which error is based on the geodetic survey of each measuring location with respect to a predetermined coordinate system, is reduced to two residual errors. The reason for the above is that only two measuring locations exist according to the invention, each corresponding to one common azimuthal axis independently of the number of objects which must be simultaneously tracked and subjected to a trajectory measurement.

Moreover, the instrument error of each theodolite, which error also enters the measurement result and is caused by an error in the alignment of the common azimuthal axis, is similarly reduced to two residual errors. The reason for the above is that the theodolites corresponding to different theodolite pairs are arranged one on top of the other on a common azimuthal axis, and, as such, all result in the same alignment error. The above further holds true, for example, for errors caused by wind gusts which result in a momentary deflection of the common azimuthal axis for respective sets of theodolites. In the event of the above, each set of theodolites on a common azimuthal axis exhibits the same instrument error.

Similarly, with respect to the calibration error of each theodolite, an initial calibration error for theodolites operating on a line corresponding to an azimuth angle of zero, i.e.

the azimuth zero line, can occur only twice, that is, once at each measuring location for all theodolites, since there are only two measuring locations in total. Moreover, the calibration error influenced by an operator when the operator is aiming a given theodolite toward the reference point corresponding to the azimuth zero line is reduced to two such errors. The reason for the above is that only one operator will be working at each of two measuring locations and further that, for all existing theodolites, each operator will naturally have the same aim toward the reference point.

Furthermore, the linear path error between each theodolite and the object to be tracked and subjected to a trajectory measurement is similarly reduced to two residual errors. Linear path errors result from a warping of a line of sight corresponding to each theodolite toward the measuring object, this warping being brought about by refraction. The amount of the refraction is a function of, among others, air temperature, humidity and intensity of sunlight. By virtue of the disposition of each set of theodolites on a common azimuthal axis, the same linear path error results for each theodolite of each set, so that, in total, only two residual errors that cannot be compensated for must be taken into account in considering the measurement results.

The measured data clock pulse errors are likewise reduced to two residual errors that cannot be compensated for. The reason for the above is that, according to the invention, each set of theodolites is tested with the same clock pulse signal, so that no clock pulse errors can occur among the theodolites of a given set.

Moreover, in the tracking and measuring arrangement according to the invention, differential and synchronizing errors between pairs of theodolites during the rotational motion of the theodolites in the azimuthal plane, that is, a rotational motion about a vertically oriented, or azimuthal axis, can be detected if, during a preliminary operation of the arrangement, all theodolites at the respective two measuring locations are aimed at a single object moving along a test trajectory. The respective measured values corresponding to each pair of theodolites are then compared in order to detect any differential and synchronizing errors between the pairs of theodolites.

The tracking and measuring arrangement according to the invention has the further advantage of considerably reducing the hardware and software expenditure necessary to meet the measuring requirements for simultaneously tracking and measuring the trajectory of several moving objects by virtue of the disposition of all theodolites in two measuring locations on two distinct axes. Moreover, the invention results in a reduction in the operating elements necessary to implement the tracking and trajectory measurement of moving objects to only two, thus reducing the communication equipment necessary to establish communication between respective measuring stations.

According to a further embodiment of the invention, each theodolite of each set is rotatable, independently of other theodolites of the set, both about the common azimuthal axis corresponding to its measuring location and about a horizontally oriented elevational axis.

According to one embodiment of the invention, the tracking and measuring arrangement can be implemented in a simple manner by configuring each theodolite to have an azimuthal rotational part which rotates about the azimuthal axis and an elevational rotational part which rotates about an elevational axis perpendicular to the azimuthal axis. The elevational rotational part may be adapted to rotate on the azimuthal rotational part. Moreover, where each measuring location includes a vertically oriented supporting column, azimuthal rotational parts of the theodolites of each set may be disposed on the vertically aligned supporting column of a corresponding measuring location so as to be rotatable with respect to one another. Thus, the azimuthal rotational part of each theodolite of a given set of theodolites (that is, of the theodolites disposed on a common azimuthal axis) are configured to rotate relative to one another on a vertically aligned supporting column and are arranged on the supporting column such that, as previously noted, they have aligned azimuthal axes. The elevational rotational part of each theodolite may carry optical or optoelectronic sensors for tracking the object.

According to another embodiment of the invention, where each measuring location includes a vertically oriented supporting column, each set of theodolites may be disposed on the vertically aligned supporting column of a corresponding measuring location such that the theodolites of the set are disposed one above the other.

According to a further embodiment of the invention, the arrangement may include a processing unit for controlling and guiding the theodolites of each set of theodolites.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components.

DETAILED DESCRIPTION OF THE INVENTION

Figure 1:
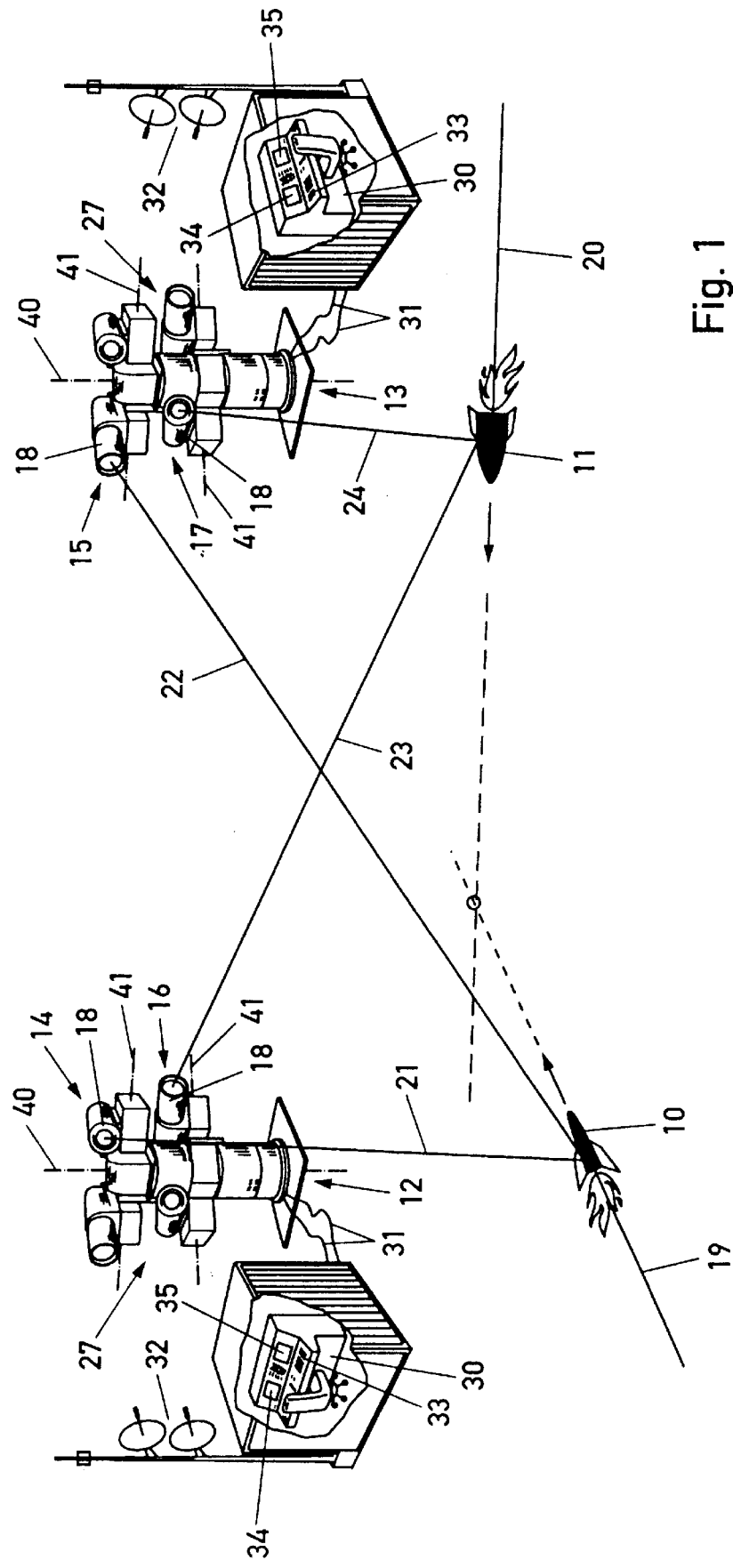
FIG. 1 is a diagrammatic view of a tracking and measuring arrangement according to the present invention.

Referring to FIG. 1, a diagrammatic view of a tracking and measuring arrangement according to the invention is shown. The arrangement of FIG. 1 allows a simultaneous tracking and a very exact measurement of the trajectories of each of two objects, such as guided missiles 10 and 11. The triangulation method may be used for determining the momentary location of each object by measuring the angle to the object in the azimuthal plane and in the elevational plane from two measuring locations 12 and 13. Measuring locations 12 and 13 are disposed at a great distance from one another. The momentary location of each object can then be determine using a trigonometric calculation which takes into consideration the distance between the measuring locations and both the azimuthal and the elevational angles sensed. The above calculation results in a measurement having a much higher precision than can be obtained, for example, using known range-only radar units which determine, in addition to the azimuthal and the elevational angles, the distance to the measuring object.

A pair of theodolites is assigned exclusively to each guided missile 10 and 11. Theodolites 14 and 15 on the one hand, and 16 and 17 on the other hand, each constitute a pair of theodolites. Pair 14, 15 is assigned to guided missile 10, while pair 16, 17 is assigned to guided missile 11, as shown. One theodolite of each pair is disposed on measuring location 12, and the other theodolite of each pair is disposed on the associated measuring location 13. Measuring location 12 therefore includes the set of theodolites comprising at least theodolites 14 and 16, and measuring location 13 includes the set of theodolites comprising at least theodolites 15 and 17. Each theodolite of a set of theodolites is thus provided for tracking and measuring a different guided missile, and includes at least one optical or optoelectronic sensor 18 for effecting the tracking and measurement required. Over the totality of the flight trajectory of missile 10 or 11, the line of sight for each sensor continues to be aimed toward the assigned missile by tracking the same. The lines of sight corresponding to theodolites 14 to 17 are shown diagrammatically in FIG. 1, and are labeled 21 to 24, respectively, while the trajectories of missiles 10 and 11 are labeled 19 and 20, respectively.

For the purpose of tracking an object using sensor 18, each theodolite 14 to 17 can be rotated about a vertically oriented azimuthal axis in the azimuthal plane, and also about a horizontally oriented elevational axis in the elevational plane. In order to effect the above, each theodolite 14 to 17 has a azimuthal rotational part 25 which rotates about the azimuthal axis and an elevational rotational part 26 which rotates about the elevational axis. The elevational axis is fixed with respect to the azimuthal rotational part 25. At least one sensor 18 is rigidly connected to and supported by elevational rotational part 26. Sensors 18 are rigidly connected to the rotational parts. Momentary rotational angles of parts 25 and 26 are output as electric measuring data.

The set of theodolites 14, 16 and 15, 17 at each measuring location 12 or 13 forms a so-called tandem theodolite 27 composed of theodolites arranged one above the other about a common azimuthal axis 40 such that the theodolites of each set can rotate independently of one another about the common axis 40.

Figure 2:
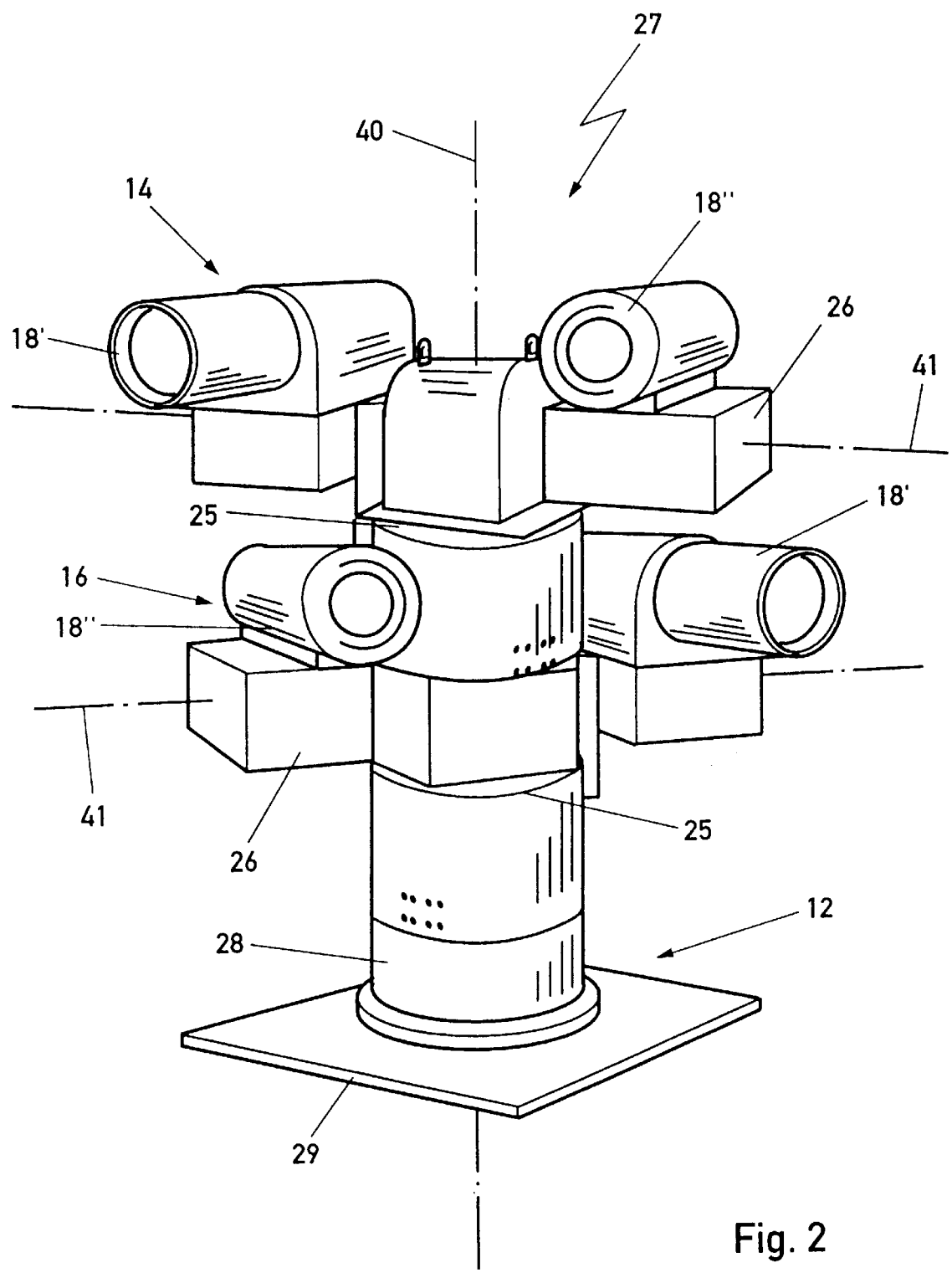
FIG. 2 is an exploded view of a set of theodolites forming a tandem theodolite according to the arrangement of FIG. 1.

Referring now to FIG. 2, an enlarged view of a tandem theodolite is shown for the set of theodolites composed of theodolites 14 and 16 at the measuring location 12. Tandem theodolite 27 for theodolites 15 and 17 at measuring location 13 has an identical configuration.

As shown in FIG. 2, tandem theodolite 27 includes a supporting column 28 which is mounted perpendicularly with respect to a support platform 29. Platform 29 is mounted to be stationary with respect to the ground. The support axis of column 28 corresponds to the common azimuthal axis 40 for the set of theodolites 14 and 16, and determines the measuring location 12. Measuring location 12 thus provides a reference location which is determined with high precision in the given coordinate system using coordinates which lie one above the other and at a right angle with respect to one another. The azimuthal rotational parts 25 for theodolites 14 and 16 of the shown set are disposed on supporting column 28 such that they can rotate about axis 40 with respect to one another. Here, the rotational azimuthal part 25 of theodolite 14 is disposed above the rotational azimuthal part 25 of theodolite 16 of the same set. The elevational part 26 of each theodolite 14 and 16 is disposed above each azimuthal rotational part 25 of the corresponding theodolite such that it can rotate by 180 degrees about elevational axes 41. Elevational rotational parts 26 are disposed on supporting column 28 such that their rotational axes 41 are perpendicular to azimuthal axis 40 of the supporting column. The elevational rotational parts 26 corresponding to respective theodolites 14 and 16 are further disposed above one another such that they do not obstruct each other's rotational motion. At least one sensor 18 is non-rotatingly fixed to each elevational rotational part 26 so that the sensor rotates together with the rotational part 25 and rotational part 26 without rotating with respect to those parts. Sensor 18 may comprise a television camera 18' or an IR camera 18". In FIG. 2, both such cameras are shown as being used for the tandem theodolite 27, and can be used alternately.

Referring back to FIG. 1, each tandem theodolite 27 is controlled by a control and data processing unit 30. Processing unit 30 controls and guides tandem theodolite 27 via cable 31 by, among others, performing checking, calibrating, adjusting, correcting and tracking functions, as well as by processing the data relating to sensed angles, or angular data, provided by each set of theodolites 14, 16 or 15, 17. Since the angular data from both measuring locations 12 and 13 are needed for arriving at the trajectory of guided missiles 10 and 11, the control and data processing units 30 assigned to each measuring location communicate with each other via information system 32. Each control and data processing unit 30 includes an operating unit, such as input keyboard 33, and display devices, such as monitors 34 and 35, where the missiles 10 and 11 and their trajectories may be displayed.

The invention is not limited to the above-described exemplary embodiment of the invention. Thus, the number of objects simultaneously tracked by the described unit can be more than two. In the event of the above, additional pairs of theodolites must be provided, each pair having one theodolite at each of the two measuring locations 12 and 13. The additional theodolites would be placed on supporting column 28 and would rotate at that location independently of any other theodolites placed on the column.

The objects to be tracked and subjected to a trajectory measurement can be flying objects, such as airplanes, bombs and rockets. However, the arrangement according to the invention can also be used to track any other moving objects, such as objects moving in water or on the ground.

The invention now being fully described, it will be apparent to one of ordinary skill in the art that any changes and modifications can be made thereto without departing from the spirit or scope of the invention as set forth in the appended claims.

I claim:

1. An arrangement for optically tracking moving objects and for measuring trajectories of the moving objects using triangulation, the arrangement comprising:
    a pair of measuring locations including a first measuring location and a second measuring location disposed at a distance with respect to the first measuring location;
    a plurality of pairs of theodolites for simultaneously tracking and measuring the trajectories of the moving objects, each pair of theodolites being effective for tracking and measuring a trajectory of a corresponding moving object and further having a first theodolite and a second theodolite, wherein:
        first theodolites of each pair of theodolites together form a first set of theodolites disposed on a common azimuthal axis at the first measuring location; and
        second theodolites of each pair of theodolites together form a second set of theodolites disposed on a common azimuthal axis at the second measuring location.

2. The arrangement according to claim 1, wherein each theodolite of each set is rotatable, independently of other theodolites of the set, both about the common azimuthal axis corresponding to its measuring location and about a horizontally oriented elevational axis.

3. The arrangement according to claim 1, wherein each theodolite includes at least one optical sensor for tracking and measuring the trajectory of the corresponding moving object.

4. The arrangement according to claim 2, wherein each theodolite includes:

an azimuthal rotational part adapted to rotate about the common azimuthal axis corresponding to the measuring location of the theodolite; and an elevational rotational part adapted to rotate about the elevational axis.

5. The arrangement according to claim 4, wherein the elevational rotational part is adapted to rotate on the azimuthal rotational part.

6. The arrangement according to claim 4, wherein:

each measuring location includes a vertically oriented supporting column; and azimuthal rotational parts of the theodolites of each set are disposed on the vertically aligned supporting column of a corresponding measuring location so as to be rotatable with respect to one another.

7. The arrangement according to claim 1, wherein:

each measuring location includes a vertically oriented supporting column; and each set of theodolites is disposed on the vertically aligned supporting column of a corresponding measuring location such that the theodolites of the set are disposed one above the other.

8. The arrangement according to claim 1, further including a processing unit for controlling and guiding the theodolites of each set of theodolites.

* * * * *